Dec. 10, 1929.  C. H. KAUFFUNG  1,739,074
AUTOMOBILE BUMPER
Filed Feb. 8, 1928
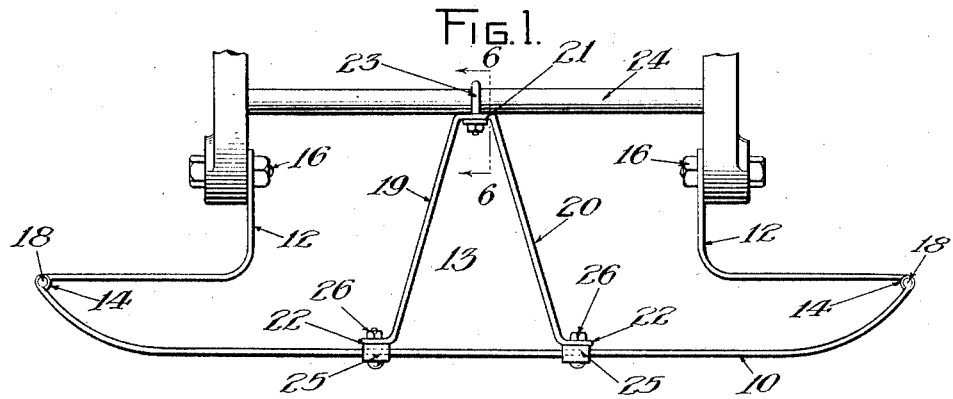
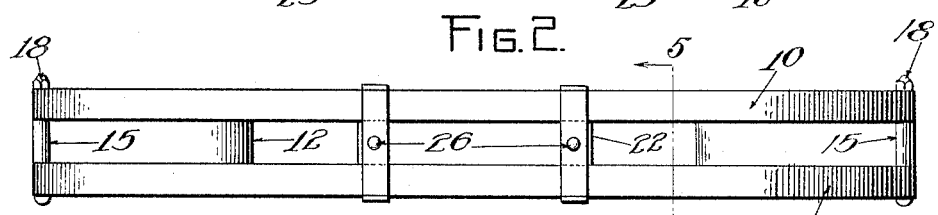
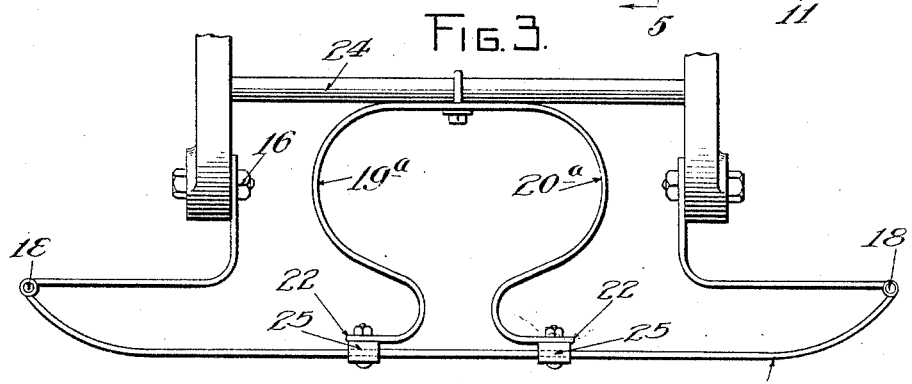
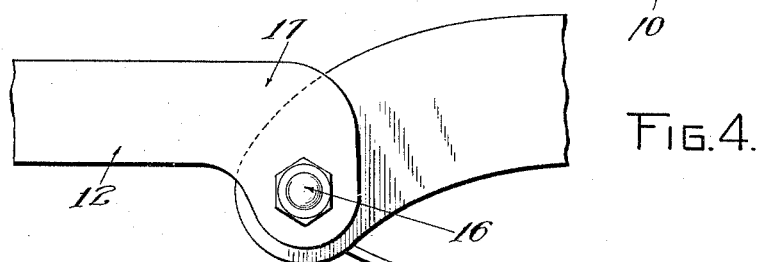
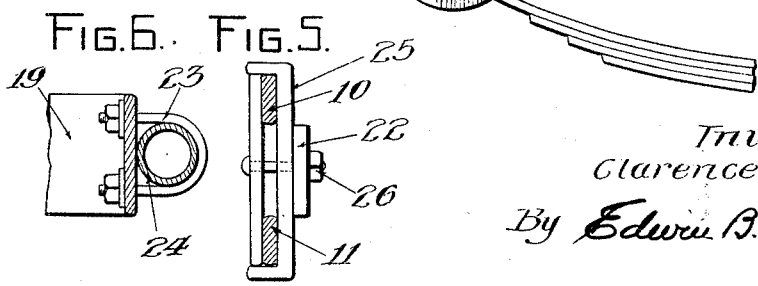
Inventor:
Clarence H. Kauffung,
By Edwin B. H. Tower Jr
Atty.

Patented Dec. 10, 1929

1,739,074

UNITED STATES PATENT OFFICE

CLARENCE H. KAUFFUNG, OF MILWAUKEE, WISCONSIN, ASSIGNOR TO BADGER MANUFACTURING CORPORATION, OF MILWAUKEE, WISCONSIN, A CORPORATION OF DELAWARE

AUTOMOBILE BUMPER

Application filed February 8, 1928. Serial No. 252,828.

This invention relates to an automobile bumper.

The bumper to which the invention applies in particular has spring impact bars and spring supporting bars pivoted to the ends thereof for attaching the bumper to an automobile.

The object of the invention is to provide an automobile bumper having a spring support intermediate the ends thereof to assist in supporting the impact bars and to increase the capacity of the bumper to receive and absorb shocks.

According to the invention, a resilient brace has its outer end connected to the impact bars intermediate the ends thereof and its inner end adapted to be attached to a cross-member of an automobile frame.

Bumpers embodying the invention are illustrated in the accompanying drawings in which the views are as follows:

Fig. 1 is a top plan view of a bumper.
Fig. 2 is a front view thereof.
Fig. 3 is a top plan view of another bumper.
Fig. 4 is a side view showing a supporting bar attached by the spring bolt to an automobile frame.
Fig. 5 is a section on the line 5—5 of Fig. 2.
Fig. 6 is a section on the line 6—6 of Fig. 1.

The bumper has spring impact bars 10 and 11 which are supported from the frame of an automobile by spring supporting bars 12 and a brace 13.

Eyes 14 and 15, formed on the ends of the impact bars and the supporting bars respectively, accommodate pins 18 and thereby pivotally connect the impact bars to the supporting bars.

The rear ends of the supporting bars 12 are attached to the automobile frame by the spring bolts 16 and have a vertical offset 17, as shown in Fig. 4, to raise the plane of the bumper above the spring bolts 16.

The brace 13, which is made of spring metal, has arms 19 and 20 joined at the inner ends thereof by a central part 21 and terminating at the outer ends thereof in flanges 22.

The central part 21 of the brace 13 is connected by a U bolt 23 to the cross-member 24 of the automobile frame.

The flanges 22 of the brace 13 are connected to the impact bars 10 and 11 by clamping plates 25 and bolts 26.

The bumper shown in Fig. 3 differs from the bumper shown in Fig. 1 only in that the arms 19ª and 20ª are bowed outwardly to provide greater resiliency between the impact bars and the cross-member 24.

The cross-member 24 is spaced farther from the impact bars than the spring bolts 16 so that the brace 13 prevents the supporting bars 12 from rotating on the bolts 16 and holds the impact bars in vertical alinement.

As the entire bumper is composed of spring metal, a shock will be distributed throughout the same and largely absorbed thereby.

The invention herein set forth is susceptible of various other modifications without departing from the scope thereof as hereafter claimed.

The invention is hereby claimed as follows:

1. An automobile bumper comprising spring impact bars, spring supporting bars having the outer ends thereof pivotally connected to the ends of said impact bars and the other ends thereof connected by spring bolts to an automobile frame, and a resilient brace connected to a cross-member of said frame and to said impact bars intermediate the ends thereof.

2. An automobile bumper comprising spring impact bars, spring supporting bars having the outer ends thereof pivotally connected to the ends of said impact bars and the other ends thereof connected by spring bolts to an automobile frame and having an offset to position said bumper vertically, and a resilient brace connected to a cross-member of said frame and to said impact bars intermediate the ends thereof.

3. An automobile bumper comprising parallel spring impact bars, spring supporting bars pivotally connected to the ends thereof, and a resilient brace connected to said impact bars at each side of the center thereof and to a cross-member of an automobile.

4. An automobile bumper comprising spring impact bars, outwardly extending spring supporting bars pivotally connected to the ends thereof, and a resilient brace having the outer ends thereof connected to said impact bars on each side of the center thereof and the inner end connected to a cross-member of an automobile.

5. An automobile bumper comprising spring impact bars, outwardly extending spring supporting bars pivotally connected to the ends thereof, and a single resilient brace having the outer ends thereof connected to said impact bars on each side of the center thereof and attached intermediate its ends to a cross-member of an automobile.

6. An automobile bumper comprising spring impact bars, spring supporting bars having the front ends thereof pivotally connected to the ends of said impact bars and the rear ends thereof pivoted on the spring bolts of an automobile, and a resilient brace connected to said impact bars intermediate the ends thereof and to the frame of said automobile to maintain said impact bars in vertical position.

7. An automobile bumper comprising parallel impact bars having eyes in the ends thereof, spring supporting bars having the inner ends thereof pivoted upon the spring bolts of an automobile and the outer ends thereof provided with eyes and arranged between the ends of said impact bars, pivot pins extending through said eyes and pivotally connecting said impact bars and said supporting bars, and a resilient bracing member attached at its center to a cross-member of the automobile frame and having diverging arms connected at the outer ends thereof to said impact bars on each side of the center thereof.

In witness whereof I have hereunto subscribed my name.

CLARENCE H. KAUFFUNG.